(12) United States Patent
Han et al.

(10) Patent No.: US 7,774,540 B2
(45) Date of Patent: Aug. 10, 2010

(54) STORAGE SYSTEM AND METHOD FOR OPPORTUNISTIC WRITE-VERIFY

(75) Inventors: Chunqi Han, San Jose, CA (US);
Anand Krishnamurthi Kulkarni, San Jose, CA (US); Richard M. H. New, San Jose, CA (US); Marco Sanvido, Belmont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 403 days.

(21) Appl. No.: 12/005,448

(22) Filed: Dec. 26, 2007

(65) Prior Publication Data

US 2009/0172324 A1 Jul. 2, 2009

(51) Int. Cl.
*G06F 13/10* (2006.01)
(52) U.S. Cl. .................. 711/112; 711/154; 711/155
(58) Field of Classification Search .................. None
See application file for complete search history.

(56) References Cited

U.S. PATENT DOCUMENTS 5,588,007 A 12/1996 Ma
5,701,304 A 12/1997 Glover et al.
5,872,800 A 2/1999 Glover et al.
6,289,484 B1 9/2001 Rothberg et al.
6,854,022 B1 2/2005 Thelin
7,076,604 B1 * 7/2006 Thelin ........................ 711/112
7,120,737 B1 10/2006 Thelin
7,139,201 B2 * 11/2006 Tanaka et al. .......... 365/185.29
2006/0106980 A1 5/2006 Kobayashi et al.
2009/0193183 A1 * 7/2009 Kudo et al. .................. 711/103

* cited by examiner

*Primary Examiner*—Than Nguyen
(74) *Attorney, Agent, or Firm*—G. Marlin Knight

(57) ABSTRACT

A storage system that stores verify commands for all the write commands requiring verification in a verify-list that will be processed as a background task is described. The verify-list can include coded data fields that flexibly designate selected alternative states or possibilities for how and where the user data is actually stored. Alternatives for the verify-list include storing the actual raw data, no data, the data in compressed form, a CRC type signature of the data and/or a pointer to a backup copy of the data that is stored either in non-volatile memory such as flash memory or on the disk media in a temporary area. In case of a verification error in various alternative embodiments the user data can be recovered using the backup copy in the verify-list in the write cache, the backup copy in flash memory or on the disk, or from the host.

20 Claims, 2 Drawing Sheets

STORAGE SYSTEM AND METHOD FOR OPPORTUNISTIC WRITE-VERIFY

FIELD OF THE INVENTION

The invention relates to the design and operation of storage devices for use with computers and more particularly to optimization of operations for verifying that data has been correctly written to the storage media.

BACKGROUND

Computers use storage devices such as disk drives for permanently recording data. The computers are typically called "hosts" and the storage devices are called "drives." A host can be connected to multiple drives, but a drive can also be connected to multiple hosts. Commands and data are transmitted by the host to the drive to initiate operations. The drive responds with formatted status, error codes and data as appropriate. Various standard command architectures have been adopted including, for example, Integrated Drive Electronics (IDE), Small Computer System Interface (SCSI) and Serial ATA (SATA).

The host computer can range in size from a small handheld device to a supercomputer cluster. The host can also be a special purpose device such as a digital camera. Similar data storage devices are used in a variety of applications including personal computers with less stringent demands, as well as large systems used by banks, insurance companies and government agencies with critical storage requirements.

A queue of commands for the storage system may be kept in the device's memory. A storage system can use the command queue to optimize the net execution time of commands by changing the order in which they executed. Among other criteria, prior art algorithms use seek time and rotational latency to optimize execution time. U.S. patent application 2006/0106980 by Kobayashi, et al. (published May 18, 2006) describes a hard disk drive that includes a queue capable of storing a plurality of commands, and a queue manager for optimizing the execution order of the plurality of commands on the basis of whether or not the execution of each command requires access to the storage medium.

A disk drive typically includes a high speed read-cache memory where selected sectors of data can be stored for fast access. A read-cache contains copies of a subset of data stored on the disk. The cache typically contains recently read data but may also contain pre-fetched sectors that occur immediately after the last one requested. A read command can be satisfied by retrieving the data from the cache when the needed data happens to be in the cache. Operations performed using only the drive's read-cache are much faster than those requiring that the arm be moved to a certain radial position above the rotating disk and having to wait for the disk to rotate into proper position for a sector to be read.

A write-cache can also be used for data that is in the process of being written to the disk. There is a critical window of time in a write operation between placing the data in the cache and actually writing the data to the disk when a power failure, for example, can cause the data to be lost. However, having the host wait until the relatively slow write process has completed can be an unnecessary inefficiency in many cases. The waiting time is justified for some data but not for all data. A so-called fast write operation simply places the data in the write-cache, signals the host that the operation is complete and then writes the data to disk at a subsequent time, which can be chosen using optimization algorithms that take into account all of the pending write commands.

Prior art command architectures have provided ways for a host to send a particular command or parameter to the drive to ensure that the data is written to the disk media before the drive signals that the write operation is complete. Writing data on the media is also called committing the data or writing the data to permanent storage.

One type of prior art command (cache-flush) directs the drive to immediately write all of the pending data in the cache to the media, i.e., to flush the cache. Flushing the entire cache on the drive may take a significant amount of time, and if done too often, reduces the benefit of the cache. Also known in the prior art is a write command with a forced unit access (FUA) flag or bit set. A write with FUA flag set will cause the drive to completely commit the write to non-volatile storage before indicating back to the host that the write is complete.

Storage systems running in an adverse environment (e.g. extreme temperature, high vibration, etc.) need to verify each write in order to increase/maintain their reliability. Unfortunately verifying every write can reduce the write throughput, because the device must wait until the disk completes a rotation before the sector can be read back. This one revolution delay substantially reduces the performance of the device. If the write failed yet another delay for rotation of the disk is needed to rewrite the data sector. Methods for reducing the impact of write verification are needed.

In U.S. Pat. No. 6,854,022 Gregory B. Thelin describes a disk drive using rotational position optimization algorithm to facilitate write verify operations. The write data can be maintained in the cache until the write-verify operation is completed. If the write-verify operation fails then the data in the cache can be rewritten to the disk. Thelin teaches execution of a write verified command according to a rotational position optimization algorithm rather than immediately after the write command to better optimize drive performance relative to mechanical latencies. Thelin's disk drive includes an input/output (I/O) queue for storing read and write commands received from a host computer, and a disk controller for executing the commands stored in the I/O queue in an order determined from a rotational positioning optimization (RPO) algorithm. The disk controller selects a write command from the I/O queue according to the RPO algorithm, seeks the head to a target track, and writes data to a target data sector. After executing the write command, the disk controller inserts a write verify command into the I/O queue. The disk controller then selects the write verify command from the I/O queue according to the RPO algorithm and executes the write verify command to verify the recoverability of the data written to the target data sector.

In U.S. Pat. No. 7,120,737 Thelin describes a disk drive employing a disk command data structure for tracking a write verify status of a write command. A microprocessor executes a write command associated with a disk command data structure by inserting the disk command data structure into a "dirty queue", and then executing the write command using the disk command data structure by writing data blocks to a plurality of target data sectors. The disk command data structure is then inserted into a write verify queue, and the disk command data structure is used to perform a write verify operation. The disk command data structure is inserted back into the dirty queue if at least one of the target data sectors fails the write verify operation.

U.S. Pat. No. 5,872,800 to Glover, et al. describes a write verify method for correcting unrecoverable sectors in a disk storage system using track level redundancy. Each track comprises a redundancy sector for reconstructing an unrecoverable data sector. The latency of the storage system is said to be minimized by generating track level redundancy data over the write range of data sectors and storing the "write" redundancy to the redundancy sector. During idle time of the storage system, the track level redundancy is regenerated for the entire track. If an unrecoverable data sector is encountered during the idle time redundancy regeneration, and the unrecoverable data sector is within the write range of the previous write operation, then it is reconstructed using the track level redundancy data stored in the redundancy sector.

U.S. Pat. No. 6,289,484 to Rothberg, et al. describes a disk drive employing off-line scan to collect selection-control data for subsequently deciding whether to verify after write. A disk drive that includes a firmware-controlled state machine with an off-line in-progress state is used to implement a scan of the multiplicity of sectors. While performing the firmware-controlled scan, steps are performed to maintain a list of sector identifiers such that each sector identifier in the list points to a sector that has failed, preferably repeatedly, to provide valid data on the fly. While the state machine is not in the offline in-progress state; the drive responds to a request to write data at a specified sector by determining whether the specified sector matches a sector identifier in the list, and if so, autonomously performing a read-verify-after-write operation.

SUMMARY OF THE INVENTION

A storage system according to the invention performs initial writing of data as in the prior art and also stores verify commands for all the write commands that must be verified in a verify-list that is maintained by the system. Identifiers in the verify-list according to alternative embodiments of the invention can include coded data fields that flexibly designate selected alternative states or possibilities for how and where the user data is actually stored. Each entry in the verify-list includes the address where the user data was written to the media along with the size of the data and in various embodiments can include the actual raw data, no data, the data in compressed form, a CRC type signature of the data and/or a pointer to a backup copy of the data that is stored either in non-volatile memory such as flash memory or on the disk media in a temporary area. The verify commands including the raw user data can be kept unaltered in the write-cache until verified, but in various alternative embodiments the user data in the verify-list in the cache can be transformed into one of the optional states. Alternatives include dynamically manipulating the user data in the verify-list using the various alternatives based on real-time system conditions such as system workload, write cache usage and/or error rate analysis.

The verify-list is processed opportunistically by the storage system as a background task, i.e., whenever the storage system has idle cycles to spare. The designated records in the verify-list will be read back from the media to verify that the write operation was successful. In case of a verification error in various alternative embodiments the user data can be recovered using the backup copy in the verify-list in the write cache, the backup copy in flash memory, the backup copy on the disk or from the host.

When the user data is stored on the rotating media (disk) then a group of write commands pending verification can optionally be coalesced and written sequentially on the disk in the temporary area.

In alternative embodiments the system can, for example, verify all write commands, only commands that the host designates as requiring verification (write-with-verify commands) or some selected combination of write commands.

DETAILED DESCRIPTION OF THE INVENTION

Figure 1:
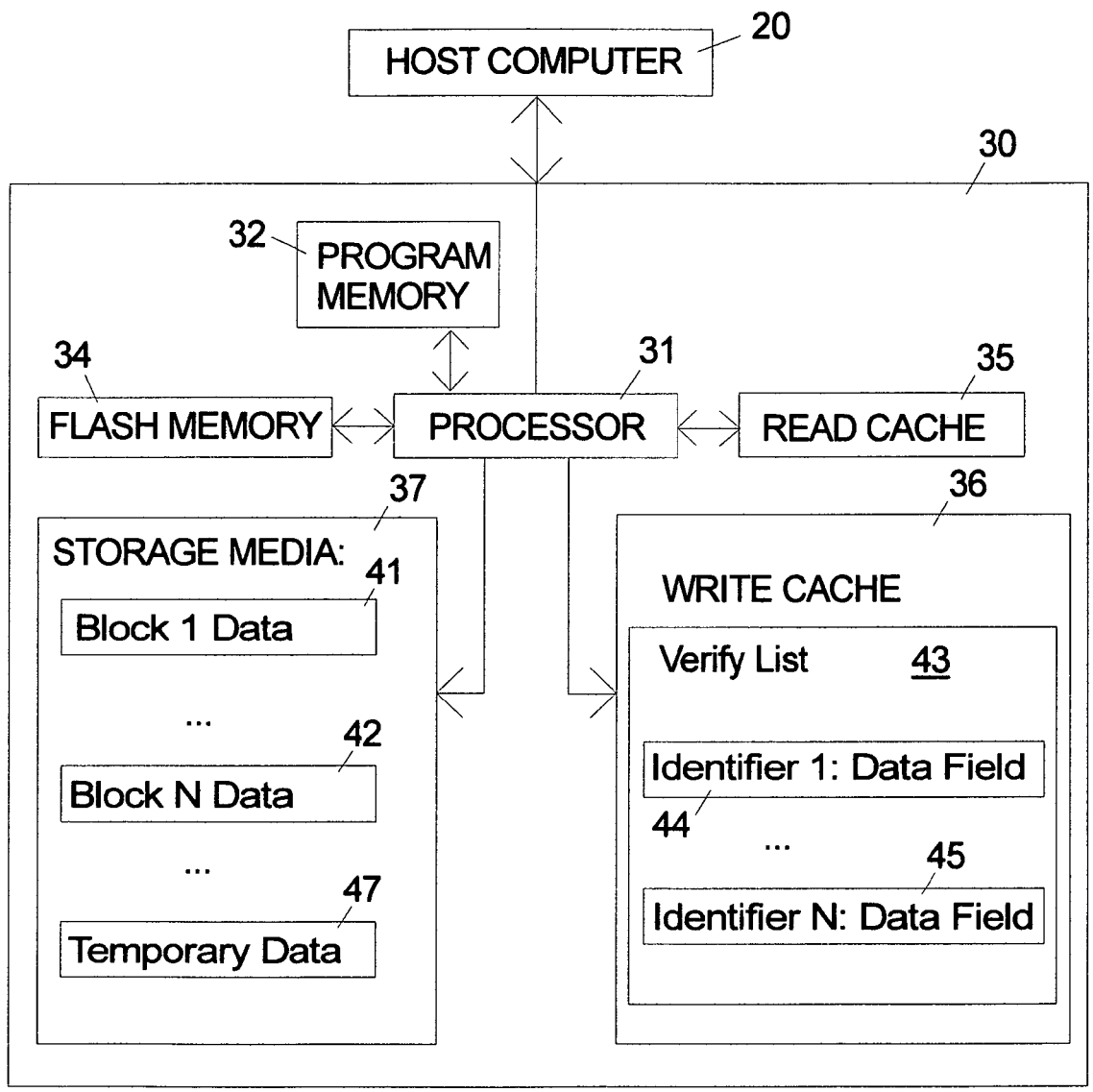
FIG. 1 is a block diagram illustrating selected components in a storage system according to an embodiment of the invention.

FIG. 1 is a block diagram illustrating selected components in a storage system 30 according to an embodiment of the invention. The invention can be used with any type of rotating storage media 37 with read/write capability including magnetic, optical and opto-magnetic. Information, commands, data, etc. flow back and forth between the host computer 20 and the storage system 30 through a communications interface which can be any hardware interface including any of the prior art interfaces currently in use. The storage system 30 includes a microprocessor 31 which accesses executable program memory 32 for its executable instructions. The commands received from the host computer 20 are executed by the storage system. Pending commands can be kept in an I/O queue and reordered according to prior art optimization techniques. In the case of write commands requiring verification the system separates the write operation from the verification operation to allow optimization of the system performance and use of the system's resources such as read-cache 35 and write-cache 36.

The system preferably includes nonvolatile memory such as flash memory 34, as well as read-cache 35 and write-cache 36 which are typically high speed RAM. When the system is operating, the program code for the microprocessor 31 can be stored in executable program memory 32, but the initial program code must originate in some form of nonvolatile memory, for example, in the form of a preprogrammed device such as an EEprom (not shown). At power-up time the system must contain at least a bootstrap program that allows basic functions to be performed to read from the disk and communicate with a host. After initialization additional program code can be read from the bulk storage media 37 and/or downloaded from the host computer 20. Storage media 37 is the nonvolatile bulk storage media such as disks with coatings that include thin film magnetic materials. Storage media 37 will typically have a much higher capacity than flash memory 34 or the read/write-cache memories 35, 36.

The system maintains a verify-list 43 in a RAM memory location such as the write-cache 36. The write-cache 36 typically also contains the write commands and data that have not yet been written to the media. The verify-list 43 can be stored as any type of data structure such as a table, a queue, a linked list or the like. An entry is created in the verify-list 43 when a selected command requiring verification is initially processed by writing the data to the storage media 37. The host can be notified at this point that the verification is complete, since the HDD will perform the verification automatically via the verify-list. In alternative embodiments a system might verify all write commands as might be appropriate for a system designed for use in harsh environments that might lead to high write failure rates. Alternatively the system could use the verify-list only for commands that the host designates as requiring verification (write-with-verify commands). Alternatively the system could select some combination of write commands that included, for example, host write-with-verify commands but also included some but not all write commands. The system could, for example, be designed to allow certain logical blocks of storage to be designated for automatic write verification while other portions were treated in the standard manner.

The verify-list includes the identifiers 44, 45 that contain essential information (not shown) that allows the write verification to be performed such as the address on the media and size information for the write command. The identifiers 44, 45 in the verify-list 43 according to alternative embodiments of the invention include coded data fields that flexibly designate selected alternative states or possibilities for how and where the user data is actually stored. The details will be described below.

After data is written to the media, the next opportunity to read and verify the data comes only after the disk rotates back around to the start of the data block, which is a relatively slow process. If the system is otherwise idle and has only one entry to verify, then the verification operation will take place as in the prior art, and the identifier will be removed from the verify-list 43.

If the system is not otherwise idle, then the invention provides various ways to perform the write-verify operations opportunistically while efficiently executing other read and write commands. Prior art methods of scheduling lower priority or background tasks can be used to determine when the write-verify operations are performed. The success or failure of the write-verify operations can be determined by prior art methods.

Figure 2:
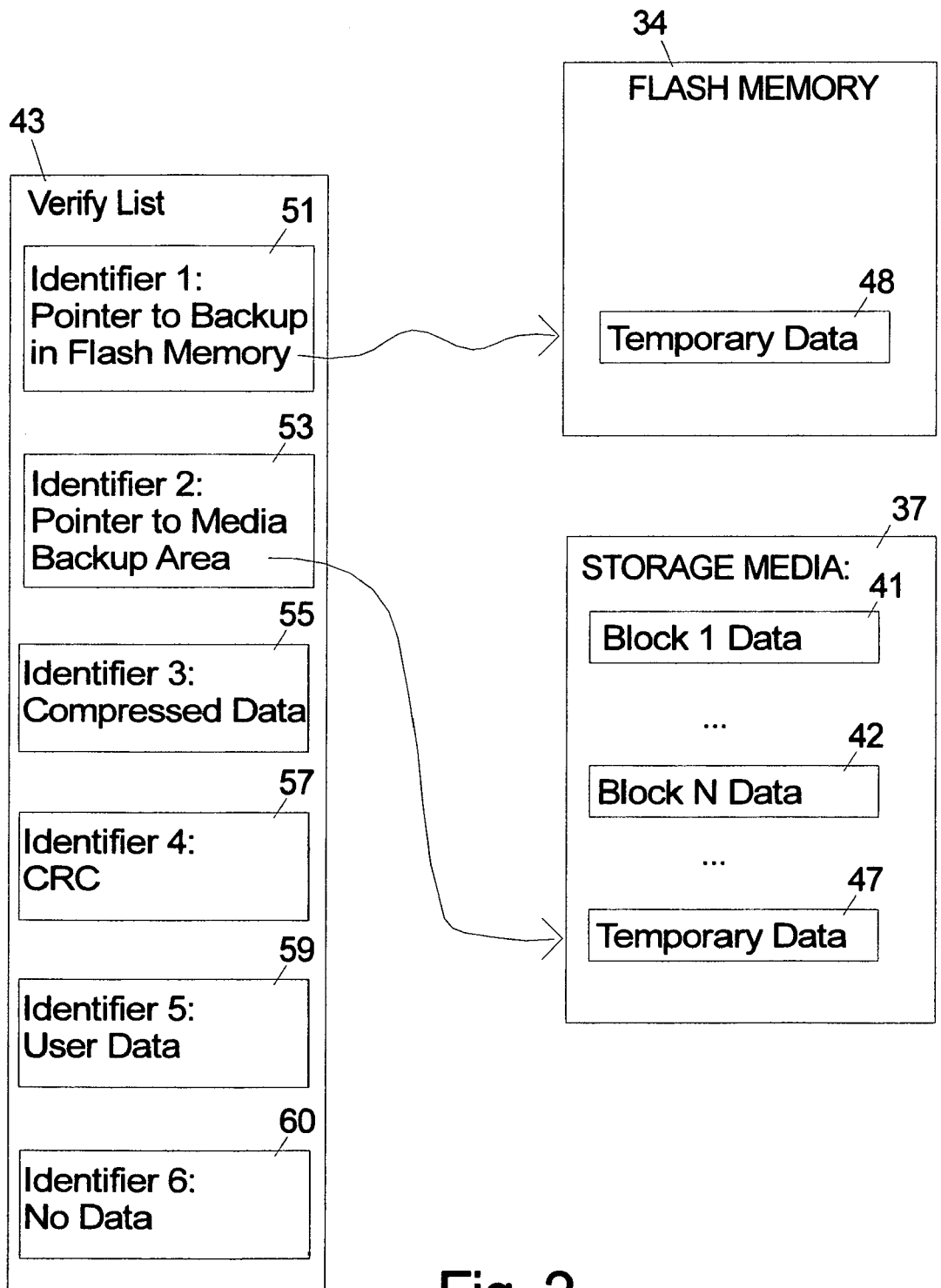
FIG. 2 is a block diagram illustrating an embodiment of the verify-list in a storage system according to an embodiment of the invention.

FIG. 2 is a block diagram illustrating an embodiment of the verify-list in a storage system. Coded data fields in the identifiers can specify the current contents of a particular entry, and entries can vary in their contents. The identifiers in the verify-list 43 according to alternative embodiments of the invention include coded data fields that can contain the actual raw user data, a pointer to the location where the backup copy of the user data has been stored, a compressed version of the data, a CRC of the data or no data at all. Identifier 59 includes the raw user data. Identifier 51 includes a pointer to the flash memory temporary data area 48 where the temporary backup copy of the user data has been stored for the write command represented by this identifier. Identifier 53 includes a pointer to the temporary data area 47 on the disk media 37 where the backup user data has been stored for this identifier. Identifier 55 includes the backup user data in compressed form. Identifier 57 includes only the CRC of the user data. Identifier 60 includes no user data.

In alternative embodiments, the system writes a backup copy of the user data in a temporary area 47 on the media and/or in flash memory 34. When the backup copy is written on the rotating media, the write can be made efficiently by providing a plurality of temporary areas position at various points on the disk so that long seeks are minimized and/or by coalescing the backups for multiple write commands into sequential storage locations in a single temporary area even though the actual write commands may specify locations that are spread out around the disk in various noncontiguous locations.

In one alternative embodiment, the system uses standard data compression techniques to compress the user data associated with the verify command in the verify-list. By reducing the size of the data in the write-cache, the burden of maintaining the verify-list is reduced. The amount of the write-cache that is used for the verify-list is further reduced by writing the user data in the flash memory 34 or in temporary area 47 on the media.

In an embodiment of the invention user data in the verify-list can be processed dynamically based on real-time system conditions including storage system workload and write cache usage. The processing options include each of the possibilities described above: compressing the user data, moving the user data to temporary non-volatile flash memory or storage, replacing the user data with CRC or hash representation or removing the user data. As one example, selected user data in the verify-list could be written to flash or compressed when the write cache usage exceeded a threshold.

In another alternative embodiment stochastic analysis of write error data collected by the system could be used to reduce the user data for blocks of storage that have had few errors and are, therefore, likely to be correct. The system could omit or remove the user data from the verify-list for blocks that have an error rate below a selected threshold value. The user data could be initially omitted from the verify-list or subsequently removed from the verify-list, but the verification will still be performed. Optionally the CRC of data can be kept in the verify-list when the data is removed. In the rare event that the verification failed for these selected blocks, the data can be resent by the host. Reducing the size of the verify-list by writing entries to flash or storage, compressing the data or removing the data improves the verification performance.

The invention has been described with reference to specific embodiments, but one of ordinary skill in the art will readily recognize variations to the embodiments and those variations are within the spirit and scope of the present invention.

The invention claimed is:

1. A method of operating a storage system:
    recording a first entry in a verify-list corresponding to a first write command that specifies writing first user data at a first location on a storage media disk, the first entry including a pointer to a location in a non-volatile memory where a backup copy of first user data is stored;
    reading data from the first location on a storage media disk to verify that first user data was correctly written;
    if the first user data was correctly written, deleting the first entry in a verify-list and deleting the backup copy of first user data; and
    if the first user data was not correctly written, performing a second write operation using the first backup copy of first user data.

2. The method of claim 1 wherein the non-volatile memory where a backup copy of first user data is stored is a flash memory.

3. The method of claim 1 wherein the location where the backup copy of first user data is stored is on a rotating disk.

4. The method of claim 3 wherein the backup copy of first user data is stored in a first temporary area on the rotating disk and the method further comprises placing a second entry in the verify-list corresponding to a second write command that specifies writing second user data at a second location on a storage media disk and wherein a backup copy of the second user data is stored in the first temporary area on the rotating disk along with the backup copy of first user data.

5. The method of claim 4 wherein the first and second user data are stored sequentially in the first temporary area.

6. The method of claim 1 further comprising placing a second entry in the verify-list corresponding to a second write command that specifies writing second user data at a second location on a storage media disk, the second entry including second user data in compressed form.

7. The method of claim 1 further comprising placing a second entry in the verify-list corresponding to a second write command that specifies writing second user data at a second location on a storage media disk, the second entry including a CRC or hash signature of the second user data.

8. The method of claim 1 further comprising notifying a host of successful completion of the first write command after placing the first entry in the verify-list but before opportunistically reading data from the first location on the storage media disk to obtain first readback data.

9. A method of operating a storage system comprising:
recording a first entry in a verify-list corresponding to a first write operation in which first user data was written to a first location on a storage media disk;
storing a backup copy of first user data in a first non-volatile memory location and placing a pointer to the first non-volatile memory location in the first entry in the verify-list;
determining that a second location on the storage media specified in a second write operation for second user data has a write-error rate below a selected threshold and recording a second entry in the verify-list corresponding to the second write operation without the second user data; and
verifying entries in the verify-list as a background task by reading back first and second user.

10. The method of claim 9 wherein the first non-volatile memory location is in a flash memory.

11. The method of claim 9 wherein the first non-volatile memory location is on a rotating disk.

12. The method of claim 9 further comprising placing a third entry in the verify-list corresponding to a third write command that specifies writing third user data at a third location on a storage media disk, the third entry including third user data in compressed form.

13. The method of claim 9 further comprising placing a third entry in the verify-list corresponding to a third write command that specifies writing third user data at a third location on a storage media disk, the third entry including a CRC or hash signature of the third user data.

14. The method of claim 9 further comprising notifying a host of successful completion of the first write command after placing the first entry in the verify-list but before opportunistically reading data from the first location on the storage media disk to obtain first readback data.

15. A storage system including:
a rotating disk with media for recording information; and
a verify-list recording write commands for which verification is required as background task, the verify-list including first and second entries corresponding to commands to write first and second user data at first and second locations on the rotating disk, the first entry including a first pointer to a first location in non-volatile storage where a backup copy of the first user data is stored, and the second entry including a second pointer to a second location in non-volatile storage where a backup copy of the second user data is stored.

16. The storage system of claim 15 including means for opportunistically reading data from the first location on the rotating disk to verify the write operation and if the write operation is not verified, performing a second write operation using the first backup copy of first user data.

17. The storage system of claim 15 wherein the location where the backup copy of first user data is stored is on the rotating disk.

18. The storage system of claim 15 wherein the backup copy of first user data is stored in a first temporary area on the rotating disk and the backup copy of the second user data is stored in the first temporary area on the rotating disk along with the backup copy of first user data.

19. The storage system of claim 18 wherein the backup copy of the first user data and the backup copy of the second user data are stored sequentially in the first temporary area.

20. The storage system of claim 18 further comprising a third entry in the verify-list corresponding to a third write command, the third entry including a CRC or hash signature of the third user data.

* * * * *